United States Patent
Jaganathan et al.

(10) Patent No.: US 9,965,216 B1
(45) Date of Patent: May 8, 2018

(54) TARGETLESS SNAPSHOTS

(71) Applicant: EMC IP Holding Company LLC, Hopkinton, MA (US)

(72) Inventors: Sathyanarayan Jaganathan, Shrewsbury, MA (US); Hana Moreshet, Framingham, MA (US); Avraham Nash, Lexington, MA (US); Ning Wu, Northborough, MA (US); Deepak Vokaliga, Westborough, MA (US); Jayapaul Paul, Karnataka (IN)

(73) Assignee: EMC IP Holding Company LLC, Hopkinton, MA (US)

(*) Notice: Subject to any disclaimer, the term of this patent is extended or adjusted under 35 U.S.C. 154(b) by 226 days.

(21) Appl. No.: 14/498,093

(22) Filed: Sep. 26, 2014

(51) Int. Cl.
| | |
|---|---|
| *G06F 12/00* | (2006.01) |
| *G06F 3/06* | (2006.01) |
| *G06F 11/14* | (2006.01) |

(52) U.S. Cl.
CPC ............ *G06F 3/065* (2013.01); *G06F 3/0604* (2013.01); *G06F 3/0689* (2013.01); *G06F 11/1458* (2013.01); *G06F 2003/0697* (2013.01)

(58) Field of Classification Search
None
See application file for complete search history.

(56) References Cited

U.S. PATENT DOCUMENTS

| | | | | |
|---|---|---|---|---|
| 2010/0023716 | A1* | 1/2010 | Nemoto | G06F 11/1451 711/162 |
| 2013/0097399 | A1* | 4/2013 | Chhaunker | G06F 12/00 711/165 |

OTHER PUBLICATIONS

Shrira, SNAP: Efficient Snapshots for Back-in-Time Execution, Proceedings of the 21st International Conference on Data Engineering (ICDE 2005).*
West, Practical PHP and MySQL Website Databases, Apress, Jan. 24, 2014.*
EMC Corporation, "z/OS and Virtual Provisioning™ Best Practices," White Paper, 32 pps., Jun. 2013.

* cited by examiner

*Primary Examiner* — Prasith Thammavong
*Assistant Examiner* — Jason W Blust
(74) *Attorney, Agent, or Firm* — Muirhead and Saturnelli, LLC

(57) ABSTRACT

Providing snapshots for a logical device includes maintaining a global sequence number for the logical device, providing a snapshot table having a plurality of entries, where each of the entries corresponds to a targetless snapshot and includes a sequence number associated with a particular one of the targetless snapshots, the sequence number corresponding to the global sequence number at a time each of the snapshots is created, and, if a sequence number associated with a specific portion of the logical device is less than the global sequence number, then prior to moving new data to a specific portion of the logical device, copying old data from the specific portion to a location in a pool device, setting a pointer in a replication data pointer table to point to the location in the pool device and setting the sequence number associated with the specific portion to equal the global sequence number.

19 Claims, 12 Drawing Sheets

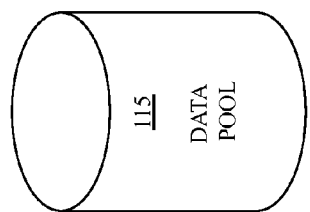
FIG. 6
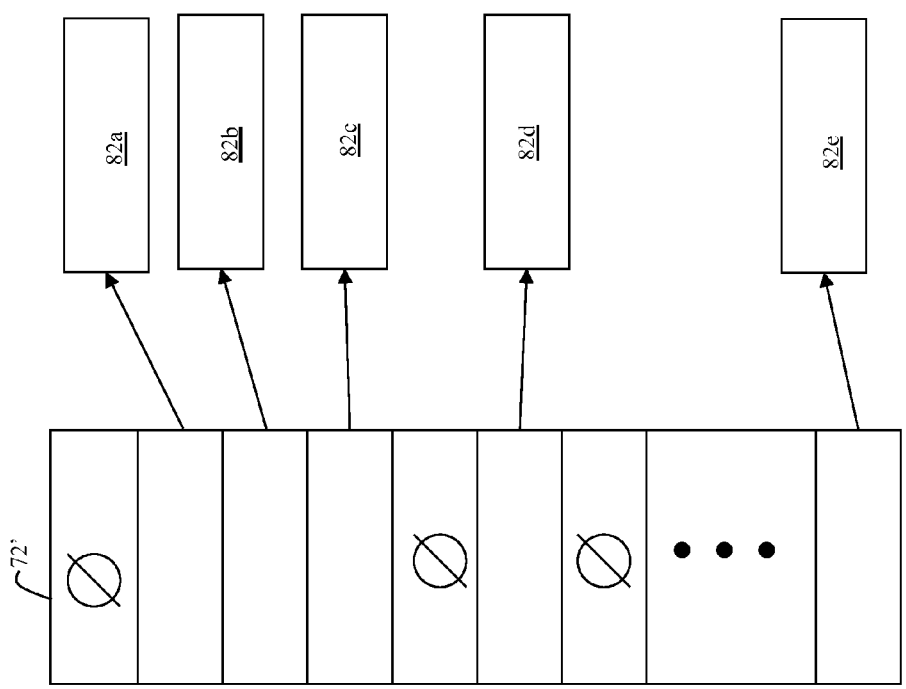
FIG. 7
FIG. 4

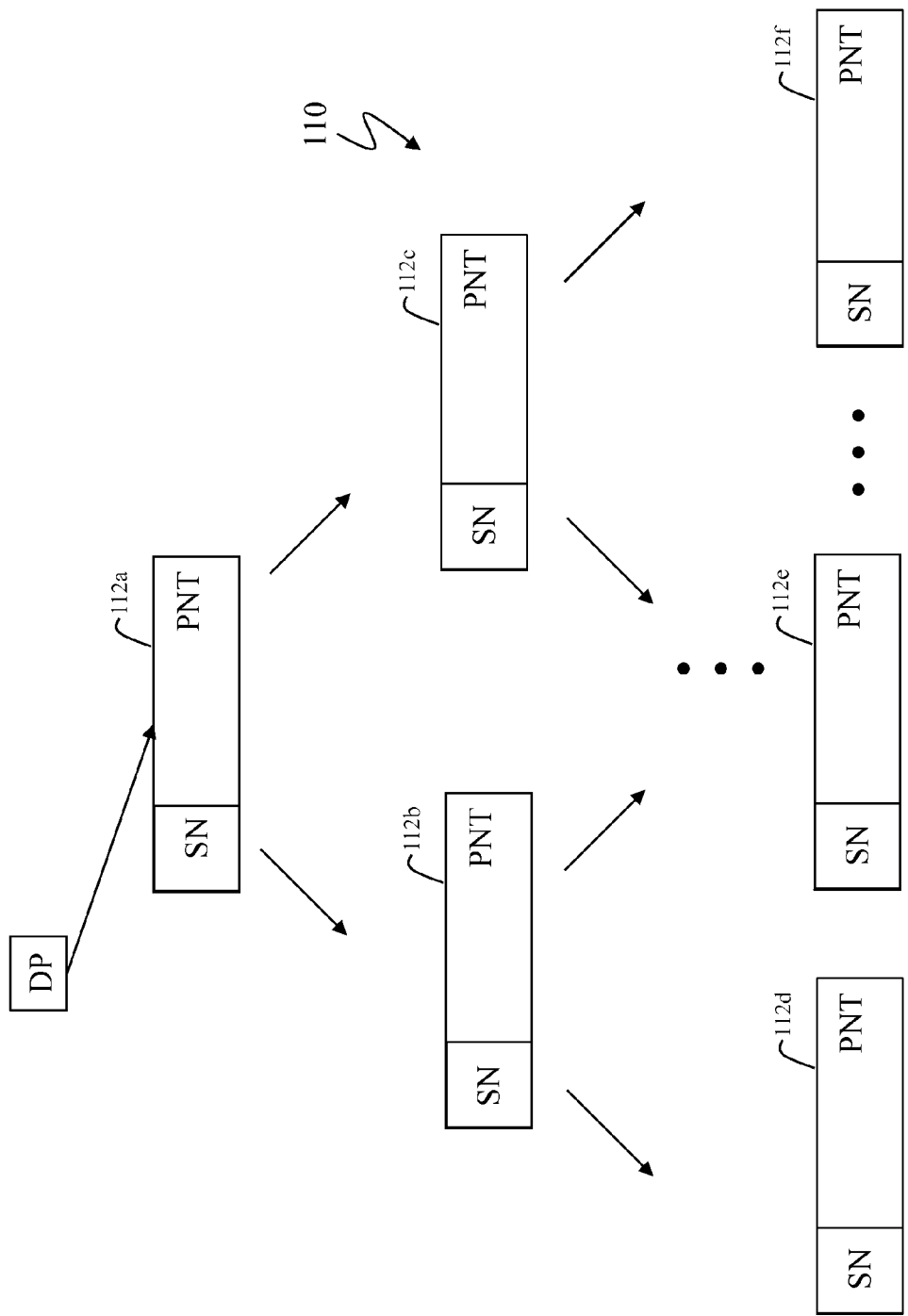

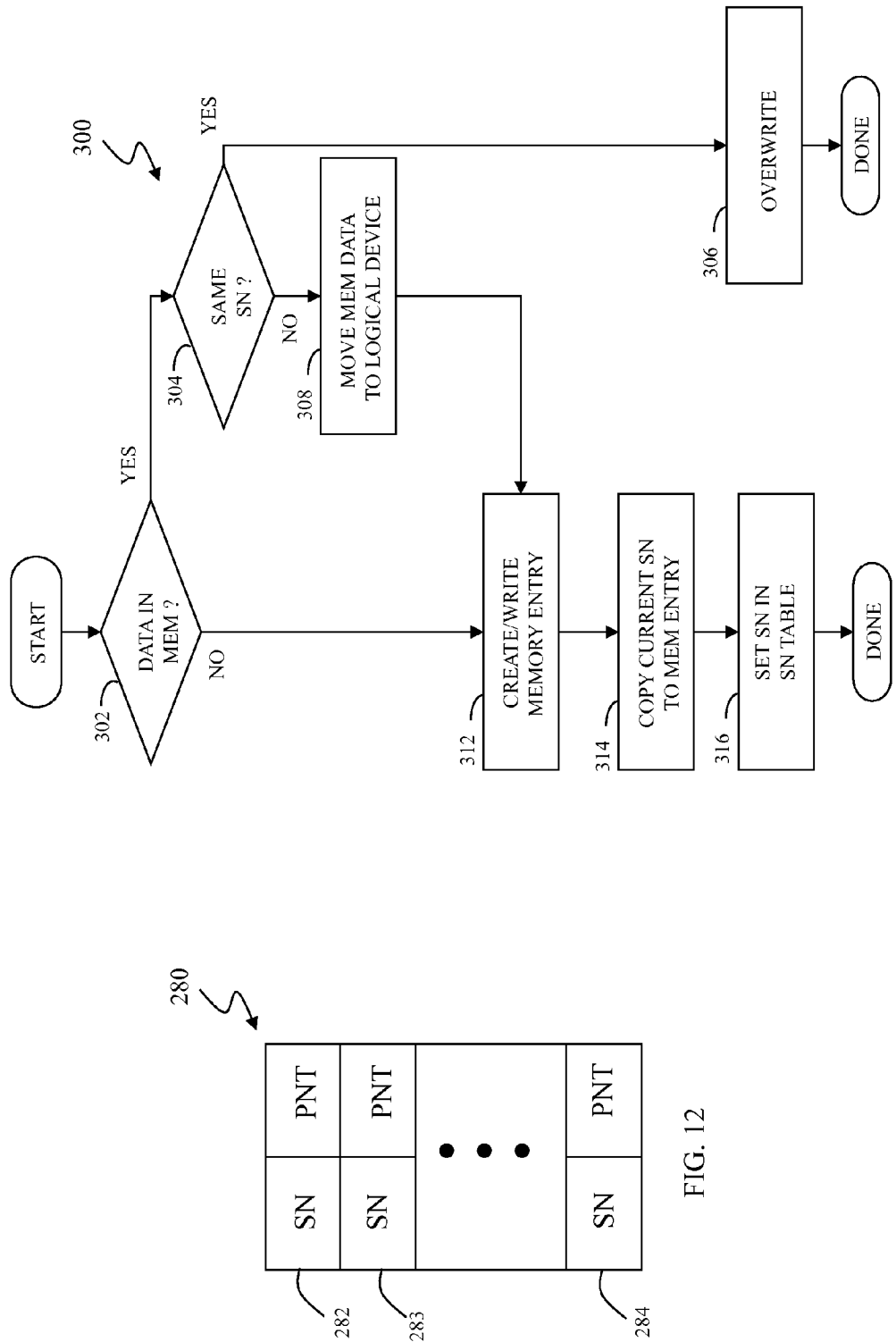

TARGETLESS SNAPSHOTS

BACKGROUND OF THE INVENTION

1. Technical Field

This application relates to computing devices, and more particularly to the field of managing storage for computing devices.

2. Description of Related Art

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

It is desirable to be able to quickly get a consistent snapshot of data of a logical volume. Snapshot functionality may be provided on a storage device using protection bits to indicate when a track needs to be copied to a target logical device for the snapshot. Such snapshot functionality is described, for example, in U.S. Pat. No. 7,340,489 to Vishlitzky, et al. titled "VIRTUAL STORAGE DEVICES", which is incorporated by reference herein. A session corresponding to the protection bit may be established so that when a protection bit is set, a write operation to a track of the storage device is intercepted before the write operation modifies the track. However, each snapshot uses at least one of the session bits (which are provided separately for each data increment, such as a track) and uses a snapshot target volume, both of which require a significant amount of overhead. In instances where it is desirable to have a large number of snapshots, this associated overhead may be unacceptable.

Accordingly, it is desirable to provide a system where it is possible to maintain a relatively large number of snapshots for a logical device without incurring the significant amount of overhead that would be associated with snapshots provided using conventional snapshot mechanisms.

SUMMARY OF THE INVENTION

According to the system described herein, providing snapshots for a logical device includes maintaining a global sequence number for the logical device, providing a snapshot table having a plurality of entries, where each of the entries corresponds to a targetless snapshot and includes a sequence number associated with a particular one of the targetless snapshots, the sequence number corresponding to the global sequence number at a time each of the snapshots is created, and, if a sequence number associated with a specific portion of the logical device is less than the global sequence number, then prior to moving new data to a specific portion of the logical device, copying old data from the specific portion to a location in a pool device, setting a pointer in a replication data pointer table to point to the location in the pool device and setting the sequence number associated with the specific portion to equal the global sequence number. Reading data from a targetless snapshot associated with a particular sequence number may include determining that a sequence number corresponding to data being read is less than or equal to the particular sequence number. The logical device may be a thin logical device. Entries in the replication data pointer table may each include a pointer to specific data in the data pool and may include a sequence number associated with the specific data. The entries in the replication data pointer table may be accessed according to each portion of the logical device. The new data may be written to memory prior to being moved to the logical device. Data written to memory may include a value of the global sequence number at a time when the data is written. Providing snapshots for a logical device may also include linking a new logical device to a first particular targetless snapshot by creating a table and setting entries in the table to point to either a portion of the logical device or a location of the pool data. Prior to setting entries in the table, each of the entries may be provided with an initial value indicating that the corresponding entry is undefined. Providing snapshots for a logical device may also include relinking the new logical device to a second particular targetless snapshot by modifying entries in the table that point to a portion of the logical device to which a write operation is performed between a time of the first particular targetless snapshot and a time of the second particular targetless snapshot.

According further to the system described herein, a non-transitory computer-readable medium contains software that provides snapshots for a logical device. The software includes executable code that maintains a global sequence number for the logical device, executable code that provides a snapshot table having a plurality of entries, where each of the entries corresponds to a targetless snapshot and includes a sequence number associated with a particular one of the targetless snapshots, the sequence number corresponding to the global sequence number at a time each of the snapshots is created and executable code that, prior to moving new data to a specific portion of the logical device, copies old data from the specific portion to a location in a pool device, sets a pointer in a replication data pointer table to point to the location in the pool device and sets the sequence number associated with the specific portion to equal the global sequence number in response to a sequence number associated with the specific portion of the logical device being less than the global sequence number. Executable code that reads data from a targetless snapshot associated with a particular sequence number may determine that a sequence number corresponding to data being read is less than or equal to the particular sequence number. The logical device may be a thin logical device. Entries in the replication data pointer table may each include a pointer to specific data in the data pool and may include a sequence number associated with the specific data. The entries in the replication data pointer table may be accessed according to each portion of the logical device. The new data may be written to memory prior to being moved to the logical device. Data written to memory may include a value of the global sequence number at a time when the data is written. The software may also include executable code that links a new logical device to a first particular targetless snapshot by creating a table and executable code that sets entries in the table to point to one of: a portion of the logical device and a location of the pool data. Prior to setting entries in the table, each of the entries may be provided with an initial value indicating that the corresponding entry is undefined. The software may also include executable code that relinks the new logical device to a second particular targetless snapshot by modifying entries in the table that point to a portion of the logical device to which a write operation is performed between a time of the first particular targetless snapshot and a time of the second particular targetless snapshot.

BRIEF DESCRIPTION OF DRAWINGS

Embodiments of the system described herein are explained with reference to the several figures of the drawings, which are briefly described as follows.

FIG. 4 is a diagram showing a table used for a thin logical device in connection with the system described herein.

FIG. 5B is a diagram showing a replication data pointer tree that may be used in connection with the system described herein.

FIG. 6 is a diagram showing a data pool used in connection with the system described herein.

FIG. 7 is a diagram showing a snapshot table used in connection with the system described herein.

FIG. 12 is a diagram showing maintaining data writes in memory in connection with the system described herein.

FIG. 13 is a flow diagram illustrating processing performed in connection with maintaining data writes in memory according to the system described herein.

DETAILED DESCRIPTION OF VARIOUS EMBODIMENTS

Figure 1:
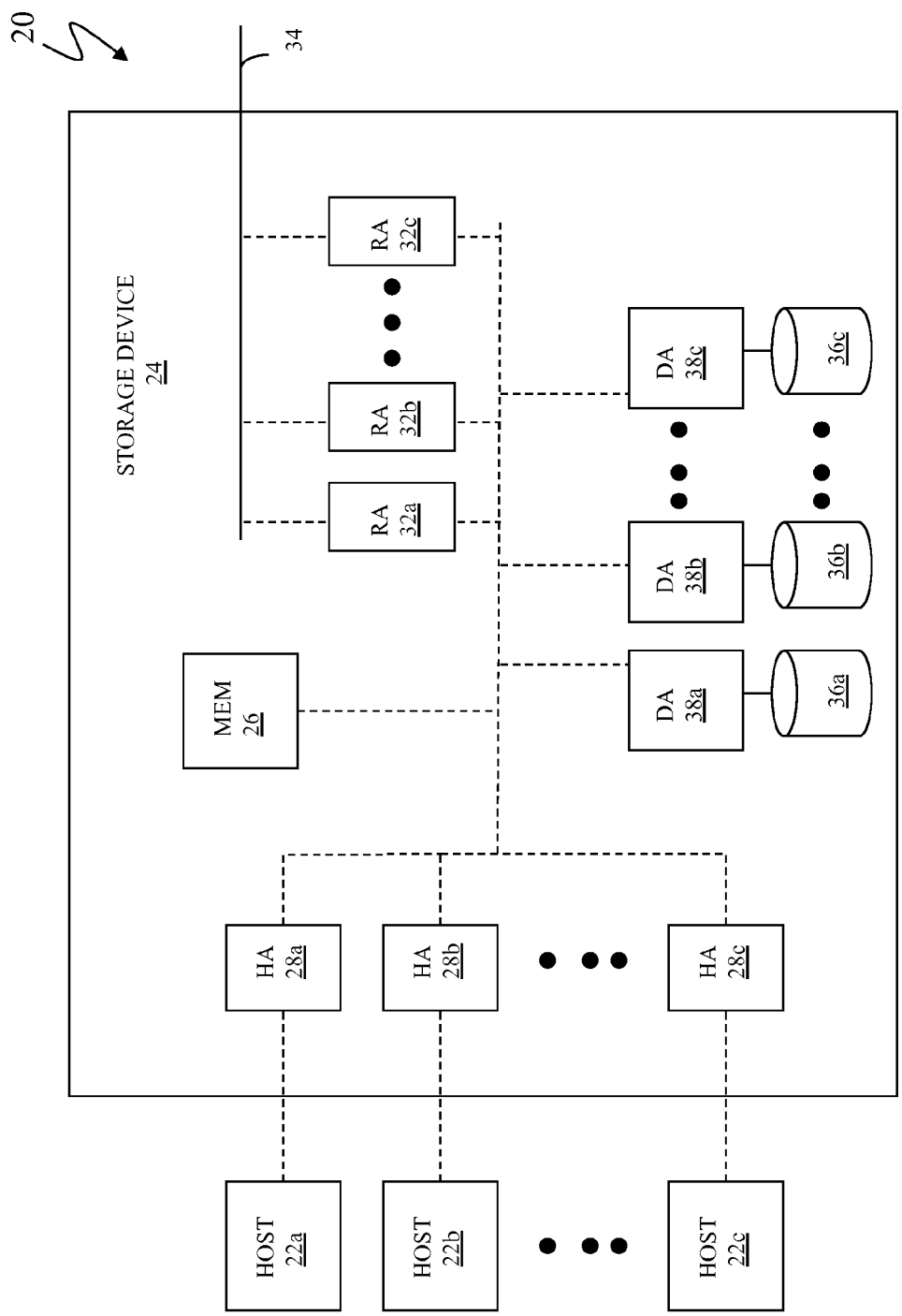
FIG. 1 is a diagram showing a plurality of hosts and a data storage device used in connection with the system described herein.

Referring to FIG. 1, a diagram 20 shows a plurality of hosts 22a-22c coupled to a data storage array 24 that may be used in connection with an embodiment of the system described herein. Each of the hosts 22a-22c may all be located at the same physical site or may be located in different physical sites and may be coupled to the data storage array 24 using SCSI, Fibre Channel, iSCSI, etc. The data storage array 24 includes a memory 26 that facilitates operation of the storage array 24, as further described elsewhere herein. The data storage array 24 also includes a plurality of host adapters (HA's) 28a-28c that handle reading and writing of data between the hosts 22a-22c and the storage array 24. Although the diagram 20 shows each of the hosts 22a-22c coupled to each of the HA's 28a-28c, it will be appreciated by one of ordinary skill in the art that one or more of the HA's 28a-28c may be coupled to other hosts. In various embodiments, the storage array 24 may be a Symmetrix storage device, a CLARiiON storage device and/or a VPLEX product produced by EMC Corporation of Hopkinton, Mass., although the system described herein may also operate in connection with any other suitable storage devices and products.

In an embodiment, the storage array 24 may include one or more Remote Data Facility (RDF) adapter units (RA's) 32a-32c. An RDF product produced by EMC Corporation, may be used to copy data from one storage array to another. For example, if a host writes data to a first storage array (e.g., a local storage array), it may be desirable to copy that data to a second storage array provided in a different location (e.g., a remote storage array). The RA's 32a-32c are coupled to an RDF link 40 and are similar to the HA's 28a-28c, but are used to transfer data between the storage array 24 and other storage arrays that are also coupled to the RDF link 40. The storage array 24 may be coupled to additional RDF links (not shown) in addition to the RDF link 40. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The storage array 24 may also include one or more disks 36a-36c, each containing a different portion of data stored on the storage array 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage array 24 that corresponds to the disks 36a-36c may be subdivided into a plurality of volumes or logical devices. The logical storage space may also be merged in connection with use of a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage array 24 may be provided as a stand-alone device coupled to the hosts 22a-22c as shown in FIG. 1 or, alternatively, the storage array 24 may be part of, and/or otherwise coupled to, a storage area network (SAN) that may include a plurality of other storage arrays as well as switches, routers, network connections, etc., as further discussed elsewhere herein.

Figure 2:
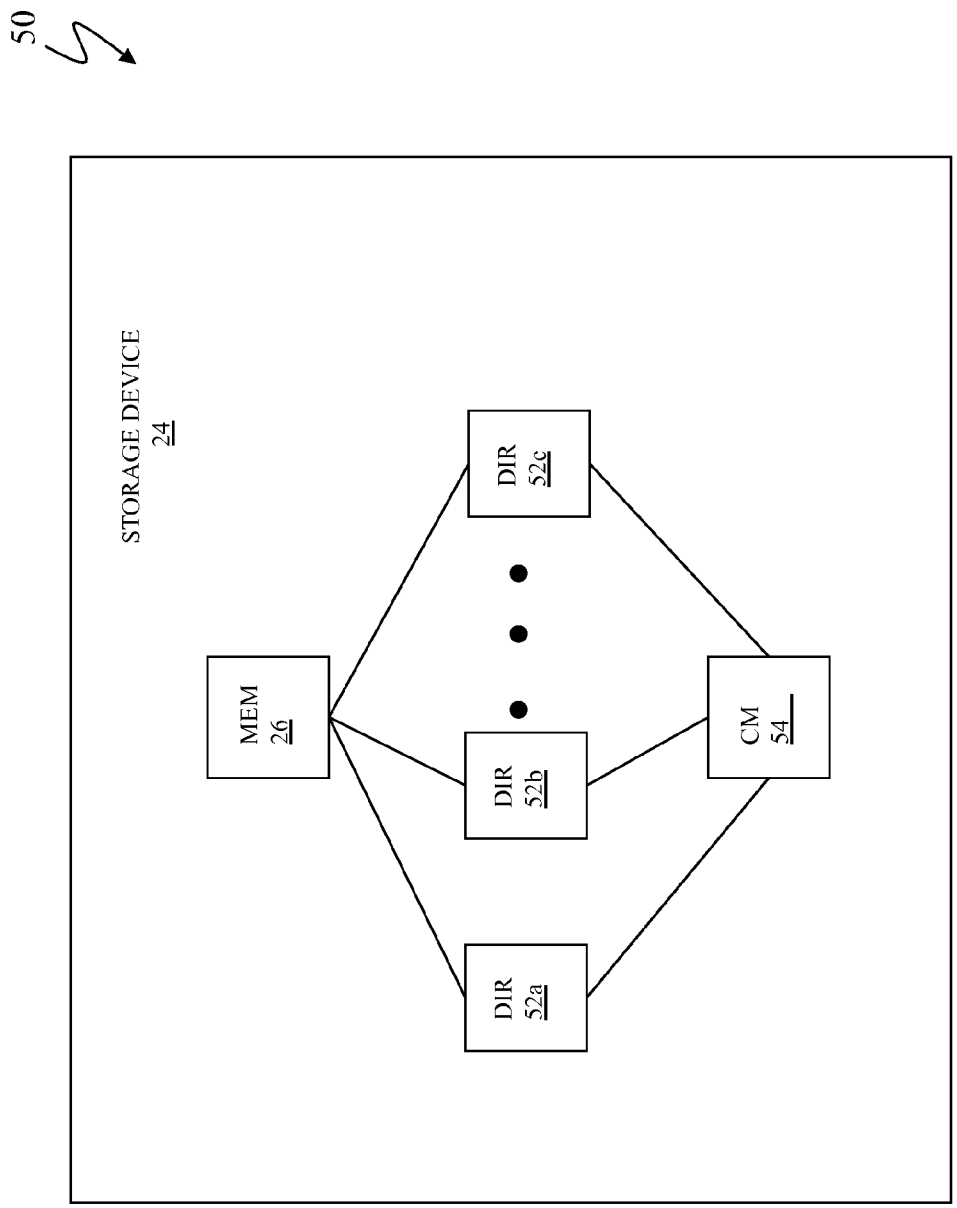
FIG. 2 is a diagram showing a storage device, memory, a plurality of directors, and a communication module according to the system described herein.

FIG. 2 is a schematic diagram 50 illustrating an embodiment of the storage array 24 where each of a plurality of directors 52a-52c are coupled to the memory 26. Each of the directors 52a-52c may represent one of the HA's 28a-28c, RA's 32a-32c, and/or DA's 38a-38c. In an embodiment herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system.

In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage array and accessible by each of the storage arrays.

Note that, although specific storage array configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
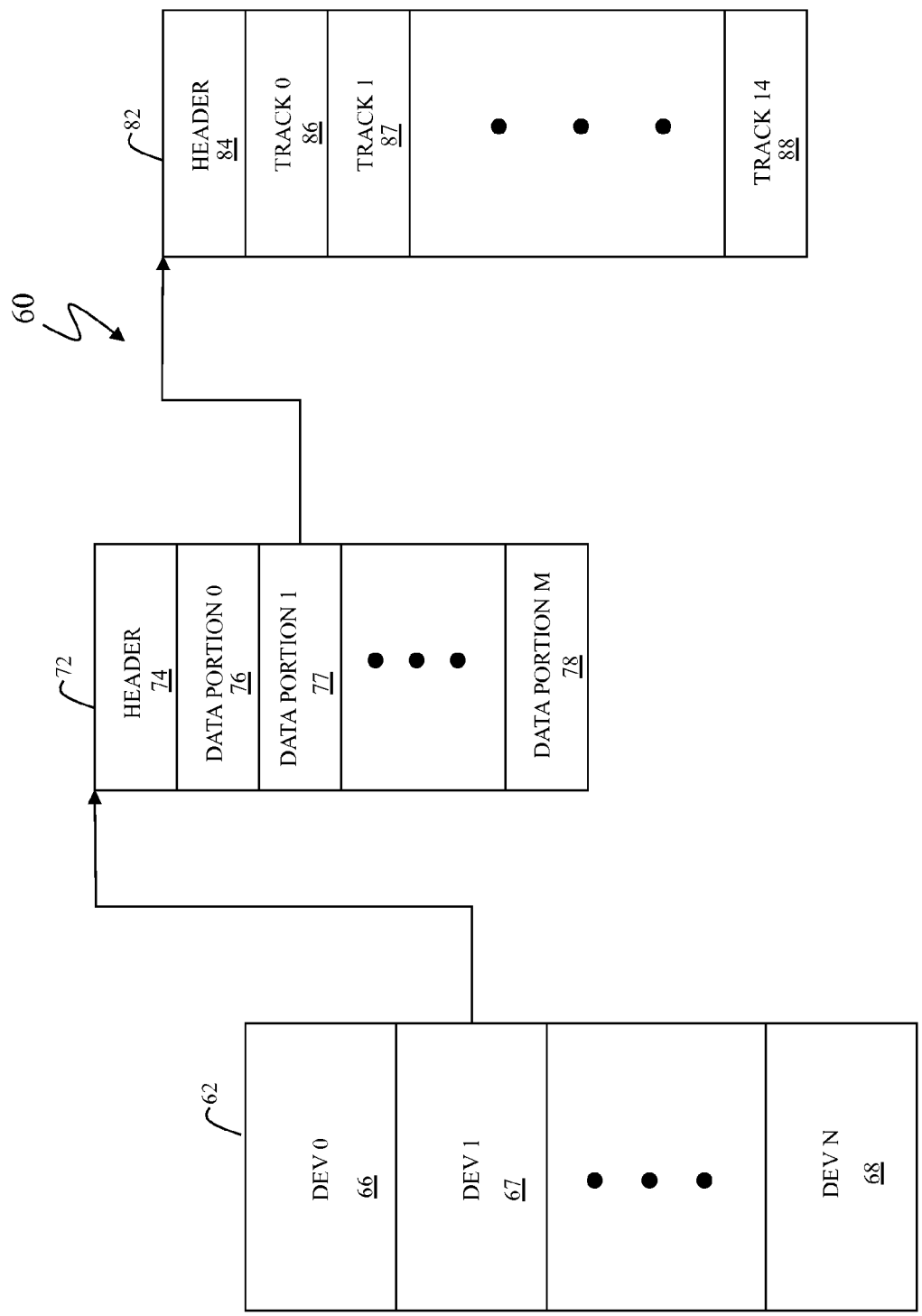
FIG. 3 is a diagram showing device tables used in connection with the system described herein.

Referring to FIG. 3, a diagram 60 illustrates tables that are used to keep track of logical device information. A first table 62 corresponds to all of the logical devices used by the storage device 24 or by an element of a storage device, such as an HA and/or a DA. The table 62 includes a plurality of logical device entries 66-68 that correspond to all the logical devices used by the storage device 24 (or portion of the storage device 24). The entries in the table 62 include descriptions for standard logical devices, virtual devices, log devices, thin devices, and other types of logical devices.

Each of the entries 66-68 of the table 62 corresponds to another table that contains information for each of the logical devices. For example, the entry 67 may correspond to a table 72. The table 72 includes a header that contains overhead information. The table 72 also includes entries 76-78 for separate contiguous data portions of the logical device (e.g., a cylinder and/or a group of tracks). In an embodiment disclosed herein, a logical device may contain any number of data portions depending upon how the logical device is initialized. However, in other embodiments, a logical device may contain a fixed number of data portions.

Each of the data portion entries 76-78 corresponds to a track table. For example, the entry 77 may correspond to a track table 82 that includes a header 84 having overhead information. The track table 82 also includes entries 86-88 for each of the tracks. In an embodiment disclosed herein, there are fifteen tracks for every contiguous data portion. However, for other embodiments, it may be possible to have different numbers of tracks for each of the data portions or even a variable number of tracks for each data portion. For standard logical devices, the information in each of the entries 86-88 includes a pointer (either direct or indirect) to a physical address on one of the disk drives 36a-36c of the storage device 24 (or a remote storage device if the system is so configured). Thus, the track table 82 may be used to map logical addresses of the logical device corresponding to the tables 62, 72, 82 to physical addresses on the disk drives 36a-36c of the storage device 24.

The tables 62, 72, 82 of FIG. 3 may be stored in the global memory 26 of the storage device 24 during operation thereof and may otherwise be stored in non-volatile memory (i.e., with the corresponding physical device). In addition, tables corresponding to logical devices accessed by a particular host may be stored in local memory of the corresponding one of the HA's 28a-28c. In addition, the RA's 32a-32c and/or the DA's 38a-38c may also use and locally store portions of the tables 62, 72, 82.

Referring to FIG. 4, a table 72' for a thin logical device is shown as including null pointers as well as entries similar to entries for the table 72, discussed above, that point to a plurality of track tables 82a-82e. The thin logical device is allocated by the system to show a particular storage capacity while having a smaller amount of physical storage that is actually allocated. When a thin logical device is initialized, all (or at least most) of the entries in the table 72' are set to null. Physical data may be allocated for particular sections as data is written to the particular data portion. If no data is written to a data portion, the corresponding entry in the table 72' for the data portion maintains the null pointer that was written at initialization.

Figure 5A:
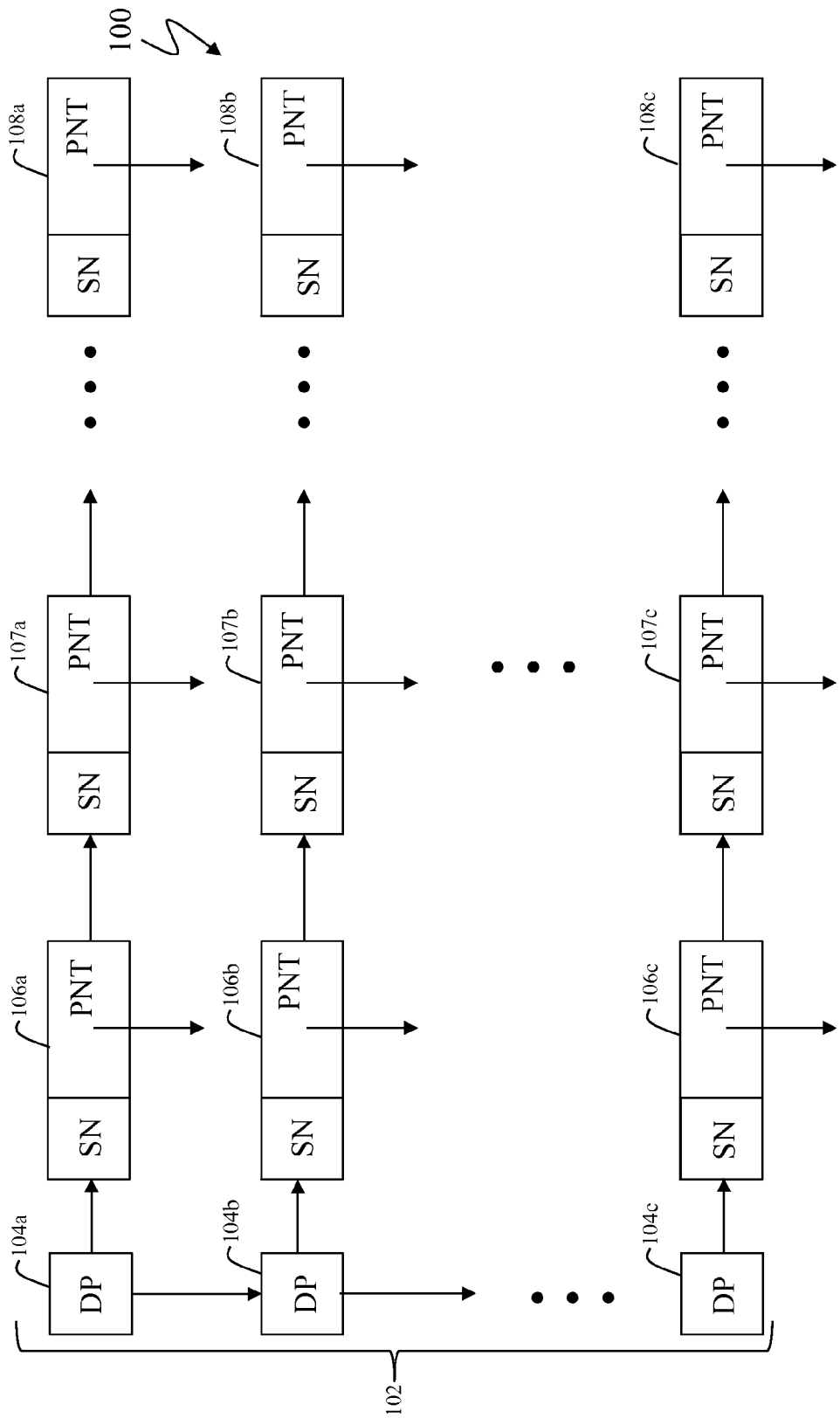
FIG. 5A is a diagram showing a replication data pointer table that may be used in connection with the system described herein.

Referring to FIG. 5A, a replication data pointers table 100 includes a first linked list 102 of a plurality of data portion numbers 104a-104c. The replication data pointers table 100 is used to maintain data that is moved in connection with providing targetless snapshots, as described herein. Each of the data portion numbers 104a-104c corresponds to a contiguous data portion of a logical device. The logical device may be a conventional logical device with all of the data portions having corresponding physical data storage allocated thereto or may be a thin logical device, described above.

Each of the data portion numbers 104a-104c corresponds to one or more table entries that are maintained using an appropriate data structure, such as a linked list. The data portion number 104a corresponds to a plurality of table entries 106a-108a, the data portion number 104b corresponds to a plurality of table entries 106b-108b, and the data portion number 104c corresponds to a plurality of table entries 106c-108c. Note that, although the table 100 is illustrated with three data portion numbers 104a-104c each having three table entries, the table 100 can contain any number of data portion numbers each having any number of table entries. In some cases, which will become apparent from the additional discussion herein, it is possible for there to be no data portion number or corresponding table entries associated with a particular data portion of a logical device. Each of the table entries 106a-108c includes a sequence number and a pointer to storage, which are explained in more detail elsewhere herein.

Referring to FIG. 5B, a replication data pointers tree 110 includes a plurality of table entries 112a-112f that each correspond to a particular data portion. Each of the table entries 112a-112f includes a sequence number and a pointer to storage. The replication data pointers tree 110 corresponds to one of the linked lists pointed to by one of the data pointers 104a-104c of the replications data pointers table 100, discussed above. The sequence number and the pointer to storage are similar to the sequence number and pointer to storage used in connection with the table 100, and are described in more detail elsewhere herein. In an embodiment herein, the tree 110 is a balanced binary tree ordered according to sequence number.

Referring to FIG. 6, a data pool 115 includes storage for data that is moved in connection with maintaining targetless snapshots. Data stored in the data pool 115 is pointed to by the pointers provided with the table entries 106a-108c or the table entries 112a-112f. In some embodiments, the data pool 115 is provided in a single logical and/or physical location. In other embodiments, the data pool 115 may be distributed and/or may use more than one physical and/or logical data storage element. Providing data to the data pool 115 is discussed in more detail elsewhere herein.

Referring to FIG. 7, a snapshot table 120 includes a plurality of entries corresponding to particular snapshots. Each of the entries includes a snapshot ID and a sequence number. The snapshot ID may be used to identify a particular snapshot and could be text (e.g., "Mar. 12, 2014, 8:00 am snapshot") or could be a token that is used by other software (not shown herein) to identify each of the snapshots. The sequence number provided with each of the snapshots is used in connection with providing targetless snapshots and is described in more detail elsewhere herein.

Figures 8, 9:
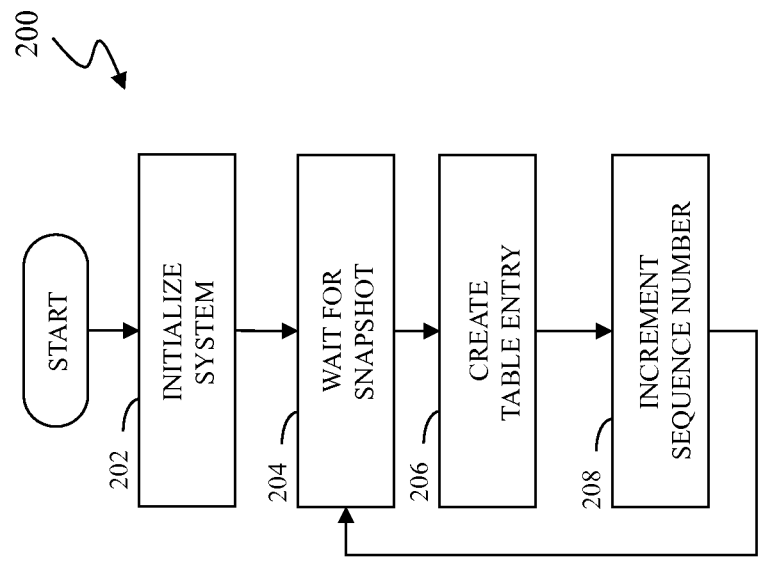
FIG. 8 is a diagram showing a sequence number pointer table used in connection with the system described herein.
FIG. 9 is a flow diagram illustrating processing performed in connection with initiating a targetless snapshot according to the system described herein.

Referring to FIG. 8, a sequence number table 130 is shown as having a plurality of entries. Each of the entries of the table 130 contains a sequence number, described in more detail elsewhere herein. The table 130 can contain a single entry for each data portion number (or other appropriate data increment) of the logical device (e.g., thin logical device) for which targetless snapshots are being provided. Thus, for example, if there are one hundred data portions in a logical device, there are one hundred entries for sequence numbers in the table 130. Use of the sequence number table 130 and of sequence numbers is described in more detail elsewhere herein.

Referring to FIG. 9, a flow diagram 200 illustrates operations performed in connection with performing targetless snapshots for a logical device. Processing begins at a first step 202 where a global sequence number (associated with the logical device for which targetless snapshots are being provided) and the tables 100, 120, 130 that are used with targetless snapshots are initialized. Note that the tree 110 may be used in addition to or instead of the table 100. In an embodiment herein, snapshot sequence numbers start at zero and are incremented by one for each snapshot, but of course in other instances it is possible to start at any number and increment or decrement by any amount. At the step 202, the replication pointers table data pointers table 100 (and/or the tree 110) is initialized to be empty (contain no entries), the snapshot table 120 is initialized to be empty, the sequence number table 130 is initialized so that each entry contains zero (the initial sequence number), and the global sequence number is initialized to zero (the initial sequence number).

Following the step 202 is a step 204 where the system waits for a snapshot to occur. A snapshot may be user initiated or may be automated to occur at specific times (e.g., every hour). Once a snapshot occurs, control transfers from the step 204 to a step 206 where an entry corresponding to the snapshot is created in the snapshot table 120. At the step 206, the ID value is provided to the new entry in the snapshot table 120 and the corresponding sequence number is set to one greater than the current global sequence number. The ID value may include a user specified name that is to be associated with the sequence number provided to the entry. Following the step 206 is a step 208 where the global sequence number is incremented. Following the step 208, control transfers back to the step 204 to wait for the next snapshot to occur.

Figures 10, 11:
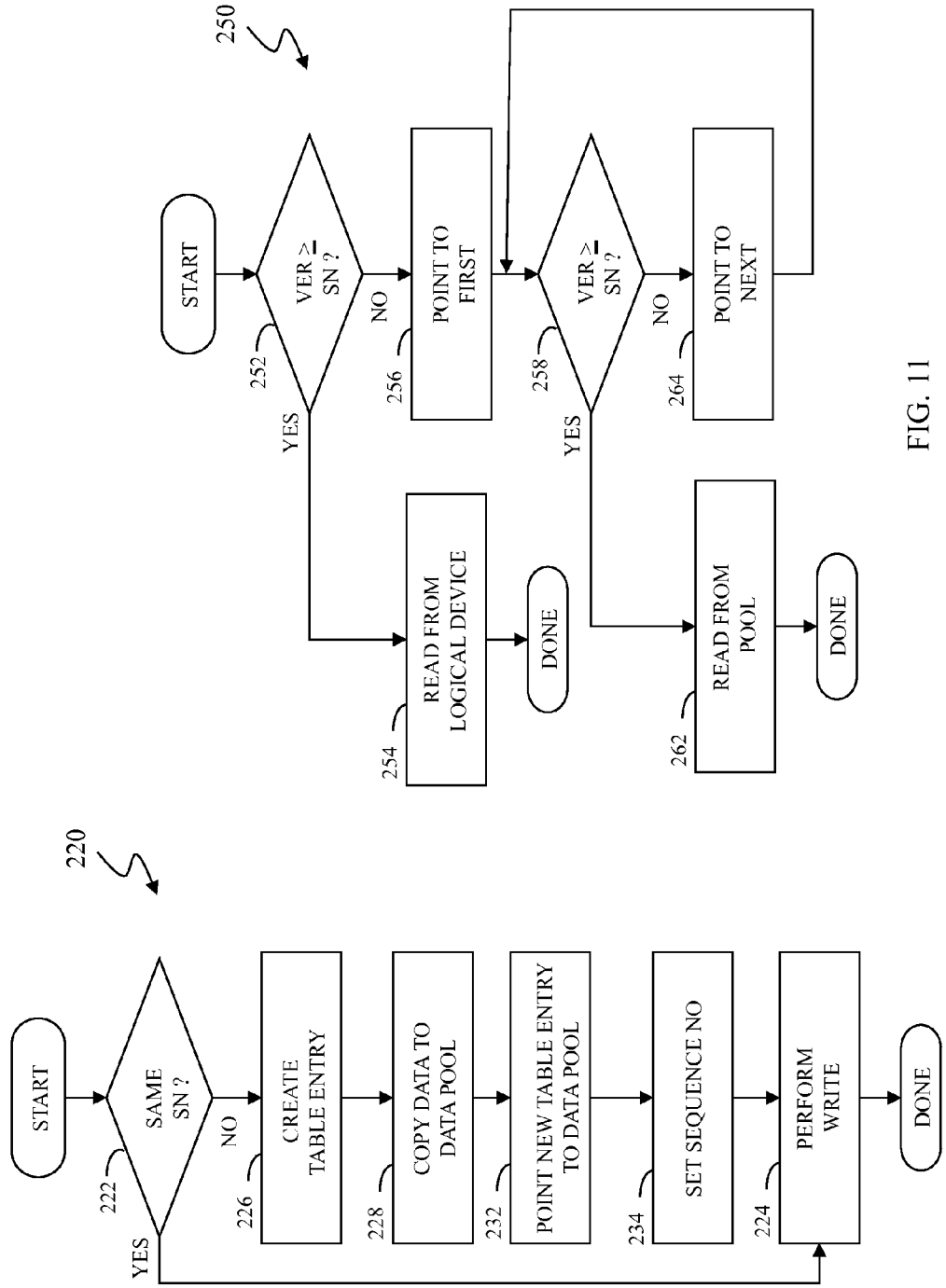
FIG. 10 is a flow diagram illustrating processing performed in connection with a write to a logical device after initiating a targetless snapshot according to the system described herein.
FIG. 11 is a flow diagram illustrating processing performed in connection with a read operation after initiating a targetless snapshot according to the system described herein.

Referring to FIG. 10, a flow diagram 220 illustrates steps performed in connection with a write operation to a logical device for which snapshots are being provided. Processing begins at a first test step 222 where it is determined if the global sequence number equals the sequence number associated with the data portion to which the write is being provided, which is provided by the sequence number table 130. If so, then control transfers from the test step 222 to a step 224 where the write operation is performed in a usual fashion. No special processing is performed in this case because the global sequence number being equal to the sequence number where the data is being written means that any snapshot data associated with that particular data section has already been protected (copied to the data pool 115, as described in more detail elsewhere herein). Following the step 224, processing is complete.

If it is determined at the step 222 that the global sequence number does not equal the sequence number associated with the data portion to which the write is being performed (the global sequence number is greater), then control transfers from the step 222 to a step 226 where an entry in the replication data pointers table 100 is created by placing the new entry in a linked list using the data portion number where the write is being performed on the logical device and using the sequence number for the source data portion (from the sequence number table 130). If the replication data pointers tree 110 is used, then at the step 226 a new entry is created for the tree 110. Following the step 226 is a step 228 where data that is being overwritten is copied from the logical device to the data pool 115. Note that the step 228 may be omitted in instances where the logical device is a thin device and the particular data portion is empty (e.g., the pointer for the data portion points to null). Note also that, in some cases data on the logical device may be cached, in which case the copy may be from the cache memory.

Following the step 228 is a step 232 where the pointer in the table entry created at the step 226, described above, is set to point to the data in the data pool 115 that was copied at the step 228, described above, or to null in the case of a thin logical device with no data in the data portion. Following the step 232 is a step 234 where the sequence number for the entry in the sequence number table 130 is set to the global sequence number, indicating that the corresponding data written to the logical device corresponds to the current global sequence number. Following the step 234 is the step 224, discussed above, where the write operation to write the new data to the device is performed. Following the step 224, processing is complete.

Referring to FIG. 11, a flow diagram 250 illustrates processing performed in connection with reading different versions from different snapshots of data on the logical device. Processing begins at a first step 252 where it is determined if a sequence number associated with a desired version (VER in flow diagram 250) is greater than or equal to a version number from the sequence number table (SNT in the flow diagram 250). For example, if it was desired to read a version of data associated with a particular snapshot (e.g., "8:00 am on Mar. 12, 2014") having a sequence number X, then the test at the step 252 would compare X with an entry in the sequence number table for the data portion of interest containing data being read, which is provided in the sequence number table 130. If it is determined at the step 252 that the sequence number of the desired version is greater than or equal to a version number from the sequence number table corresponding to the data being read, then data on the logical device was written prior to the time of the snapshot and control transfers from the step 252 to the step 254 where the data is read from the logical device. Note that this also occurs when it is desired to read current data from the logical device since data on the logical volume is always the latest version. Following the step 254, processing is complete.

If it is determined at the step 252 that the sequence number of the desired version is not greater than or equal to a version number from the sequence number table corresponding to the data being read, then data on the logical device was written after the time of the snapshot and the desired data is in the data pool 115 and control transfers from the step 252 to a step 256 where an iteration pointer is set to point to a first item in a list of items in the replication data pointers table 100. The iteration pointer is used to traverse a list of pointers for a data portion corresponding to the data being read. For the explanation herein, it is assumed that the list of pointers is arranged with the most recently added table entry (having the highest sequence number) being first in the list, followed by the next most recently added table entry (having the second highest sequence number), etc. Generally, the iteration pointer iterates through table entries for a specific data portion from highest sequence number to lowest sequence number. Note that, in instances where the replication data pointers tree 110 is used, the iteration pointer is set to point to the top of the tree 110 and is used to traverse the tree 110.

Following the step 256 is a test step 258 where it is it is determined if a sequence number associated with the desired version is greater than or equal to a version number associated with the table or tree entry indicated by the iteration pointer, similar to the test at the step 252, discussed above. If so, then control transfers from the test step 258 to a step 262 where data is read from the data pool 115 according to the data pointer of the table or tree entry indicated by the iteration pointer. Following the step 262, processing is complete. Otherwise, if it is determined at the step 258 that the sequence number associated with the desired version is not greater than or equal to the version number associated with the table or tree entry indicated by the iteration pointer, then control transfers from the step 258 to a step 264 where the iteration pointer is set to point to a next table or tree entry. Note that the final item of the table or tree entries has a sequence number of zero so that, eventually, the test at the step 258 will cause the step 262 to be executed.

In some instances, it is possible to maintain written data in memory (e.g., in a cache database in the global memory 26). Version information may be maintained with the written data in memory to facilitate eventually moving the data to the logical device while providing targetless snapshots as described herein. The data may be moved using a background process.

Referring to FIG. 12, a table 280 is shown as including a plurality of entries 282-284. Each of the entries 282-284 has a sequence number used for targetless snapshots and has corresponding data. The sequence number represents a value of the global sequence number at a time that the data is written. Data that is written to the logical device may be initially provided to the table 280, which may be stored in relatively fast volatile memory. Data from the table 280 may then be migrated to the logical device in a background operation. This is described in more detail elsewhere herein.

Referring to FIG. 13, a flow diagram 300 illustrates steps performed in connection with initially writing data to memory in a system using targetless snapshots. Processing begins at a first test step 302 where it is determined if other data corresponding to the particular data portion being written is already in memory from a previous write operation. If so, then control transfers from the test step 302 to a test step 304 where it is determined if the data currently in memory corresponds to data written during the current cycle (current value of the global sequence number associated with the logical device). If so, then control transfers from the step 304 to a step 306 where the data being written overwrites the data in memory. Following the step 306, processing is complete.

If it is determined at the step 304 that the data currently in memory does not correspond to data written during the current cycle, then control transfers from the test step 304 to a step 308 where the data currently in memory is moved to the logical device. Processing at the step 308 is discussed in more detail elsewhere herein. Following the step 308 is a step 312 where an entry for the data currently being written is created in the memory and the data being written is copied to the just-created memory entry. Note that the step 312 is also reached from the step 302 if it is determined at the step 302 that there is no data in memory corresponding to the portion being written. Following the step 312 is a step 314 where the sequence number for the data portion (from the sequence number table 130) is copied to the new memory entry. Following the step 314 is a step 316 where the sequence number in the sequence number table is set to the current value of the global sequence number. Following the step 316, processing is complete.

Figure 14:
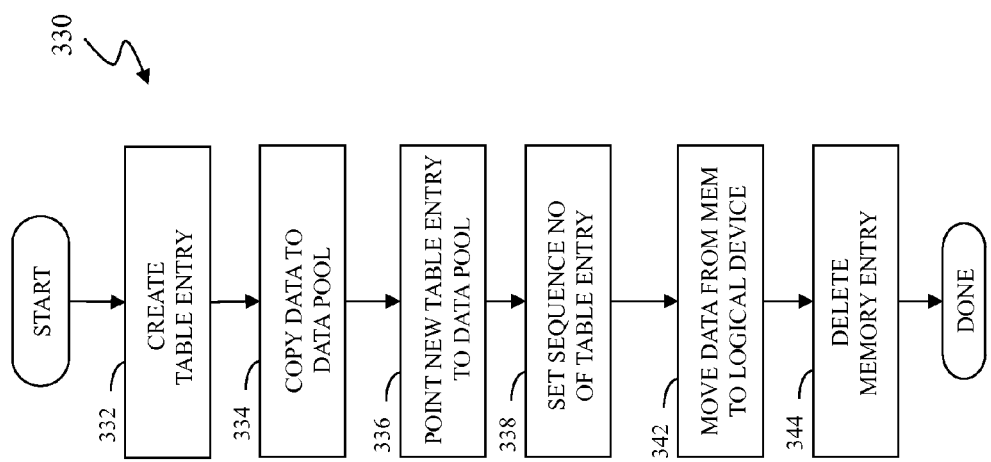
FIG. 14 is a flow diagram illustrating processing performed in connection with moving data from memory to a logical device according to the system described herein.

Referring to FIG. 14, a flow diagram 330 illustrates in more processing performed in connection with the step 308 of the flow diagram 300, described above. The processing illustrated by the flow diagram 330 may also be provided in connection with a background process for moving data from memory to the logical device, discussed elsewhere herein. Processing begins at a first step 332 where an entry is created in the replication data pointers table 100 or the replication data pointers tree 110 (whichever is used). The entry is similar to other entries in the table 100 or tree 110, discussed elsewhere herein. Following the step 332 is a step 334 where data from the logical device is copied to the data pool 115. Following the step 334 is a step 336 where the pointer in the new table or tree entry (created at the step 332) is set to point to the data copied to the pool at the step 334.

Following the step 336 is a step 338 where the sequence number of the new table or tree entry is set to the sequence number of the entry of the table 280 in memory that is being moved. Following the step 338 is a step 442 where the data in memory is copied to the logical device just as if the data were being written to the logical device. Following the step 342 is a step 344 where the memory entry is deleted (or possibly returned to a pool of free memory entries, as appropriate). Following the step 344, processing is complete. Note that the result of processing illustrated by the flow diagram 330 is similar to the result provided by processing illustrated by the flow diagram 220, described above, where data is written to a logical device without being first maintained in memory.

In some cases, it may be desirable to link a target volume for an otherwise targetless snapshot to provide a conventional snapshot volume. Although, as described elsewhere herein, it is possible to access different versions of targetless snapshots, providing a link for a targetless snapshot allows application access to the linked volume in a conventional manner.

Figure 15:
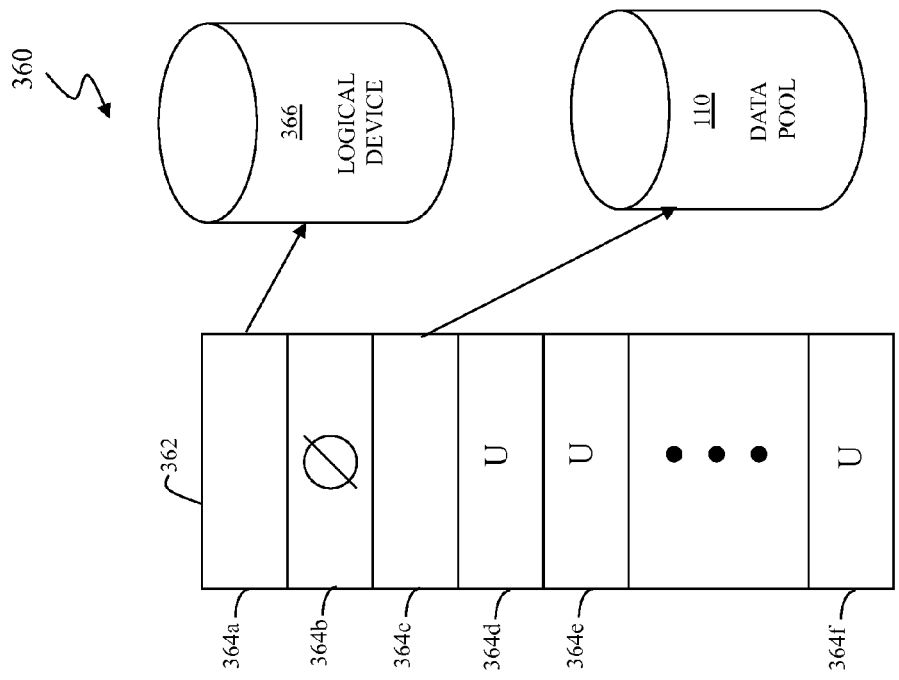
FIG. 15 is a diagram showing linking a logical volume to a targetless snapshot in connection with the system described herein.

Referring to FIG. 15, a diagram 360 illustrates creating a linked volume. The linked volume includes a table 362 that is similar to the other tables 72, 72' discussed elsewhere herein where a plurality of entries 364a-364f in the table 362 include pointers to data portions. In the case of a linked volume, the each of the entries 364a-364f points to one of: an underlying logical volume 366 for which targetless snapshots are being provided, the data pool 115, or null (if the logical volume 366 is a thin volume). The entries 364d-364f that contain a "U" indicate that those particular entries are undefined. As discussed in more detail elsewhere herein, when a linked volume is first allocated, then entries in the corresponding table are all undefined. Subsequently, a process traverses the table and defines all the entries to point to the either underlying logical volume, the data pool, or, in the case of a thin logical volume, null (indicating an unallocated portion on the underlying thin logical volume). This is described in more detail elsewhere herein. The linked volume may correspond to a snapshot having a particular sequence number, which becomes the target global sequence number of the linked volume.

Figure 16:
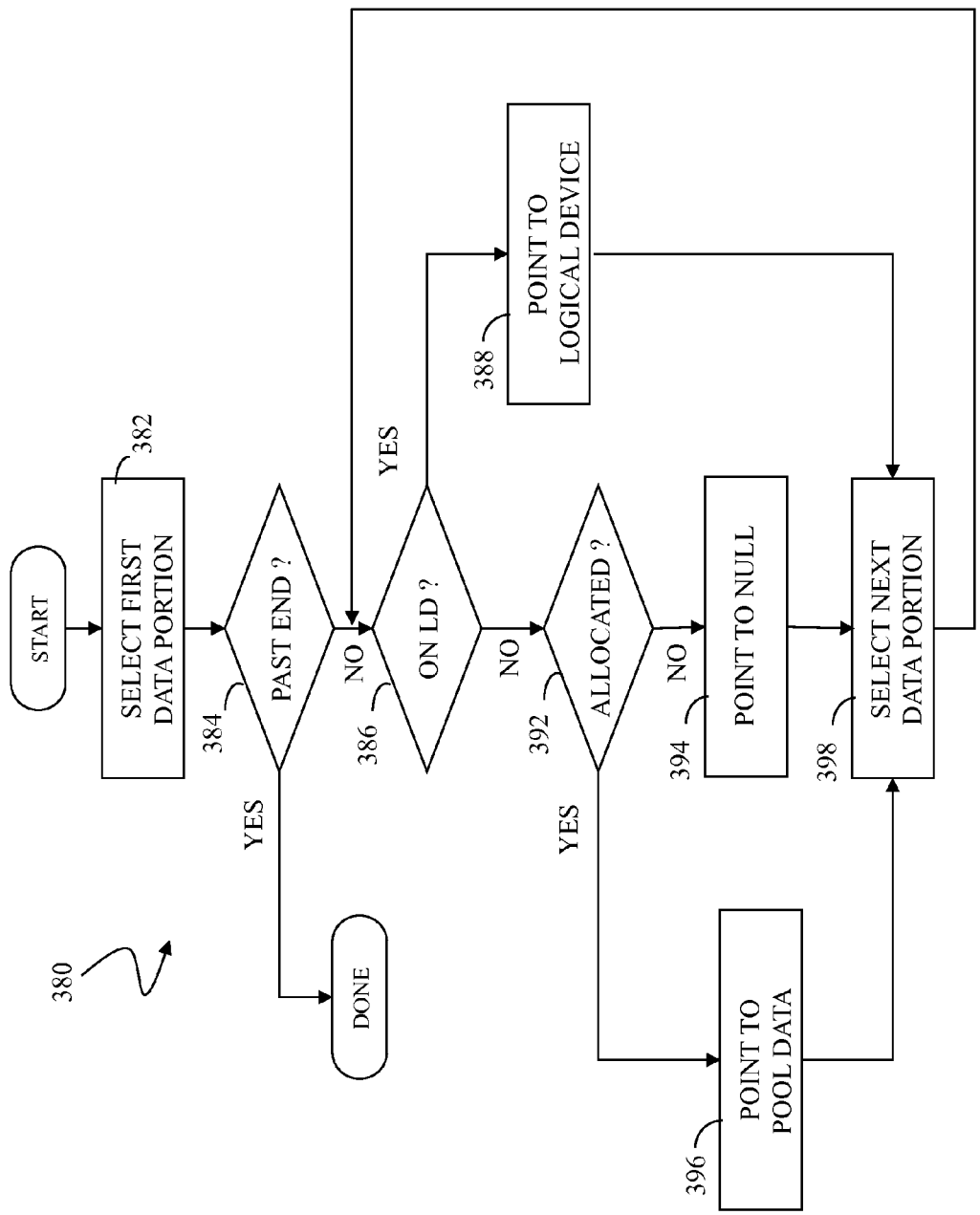
FIG. 16 is a flow diagram illustrating processing performed in connection with linking a logical volume to a targetless snapshot according to the system described herein.

Referring to FIG. 16, a flow diagram 380 illustrates processing performed in connection with traversing undefined entries in a table for a linked volume (like the table 362, discussed above) and causing the entries to be defined. Processing begins at a first step 382 where an iteration counter is set to point to a first one of the entries in the table. Following the step 382 is a test step 384 where it is determined if all of the entries in the table have been processed. If so, then processing is complete. Otherwise, control transfers from the step 384 to a test step 386 where it is determined if the data portion corresponding to the entry indicated by the iteration counter points to the underlying logical device. The determination at the step 386 is similar to processing for the flow diagram 250, discussed above, and depends upon the version number being linked.

If it is determined at the step 386 that the data portion corresponding to the entry indicated by the iteration counter points to the underlying logical device, then control transfers from the test step 386 to a step 388, where the corresponding table entry is set to point to the logical device. Otherwise, control transfers from the test step 386 to a test step 392 where it is determined if the data portion corresponding to the entry indicated by the iteration counter is allocated. If not, then control transfers to a step 394 where the corresponding entry in the table is set to null. Otherwise, control transfers to a step 396 where the corresponding entry in the table is set to point to the data pool 115. Following the step 396 is a step 398 where the iteration counter is incremented. Note that the step 398 also follows the steps 388, 394. Following the step 398, control transfers back to the step 384 for a subsequent iteration.

In some instances, it may be desirable to relink a logical volume from one targetless snapshot to another targetless snapshot. That is, a logical volume that has been or is in the process of being linked to a first snapshot may be unlink from the first snapshot and, at the same time, linked to a second, different, snapshot.

Figure 17:
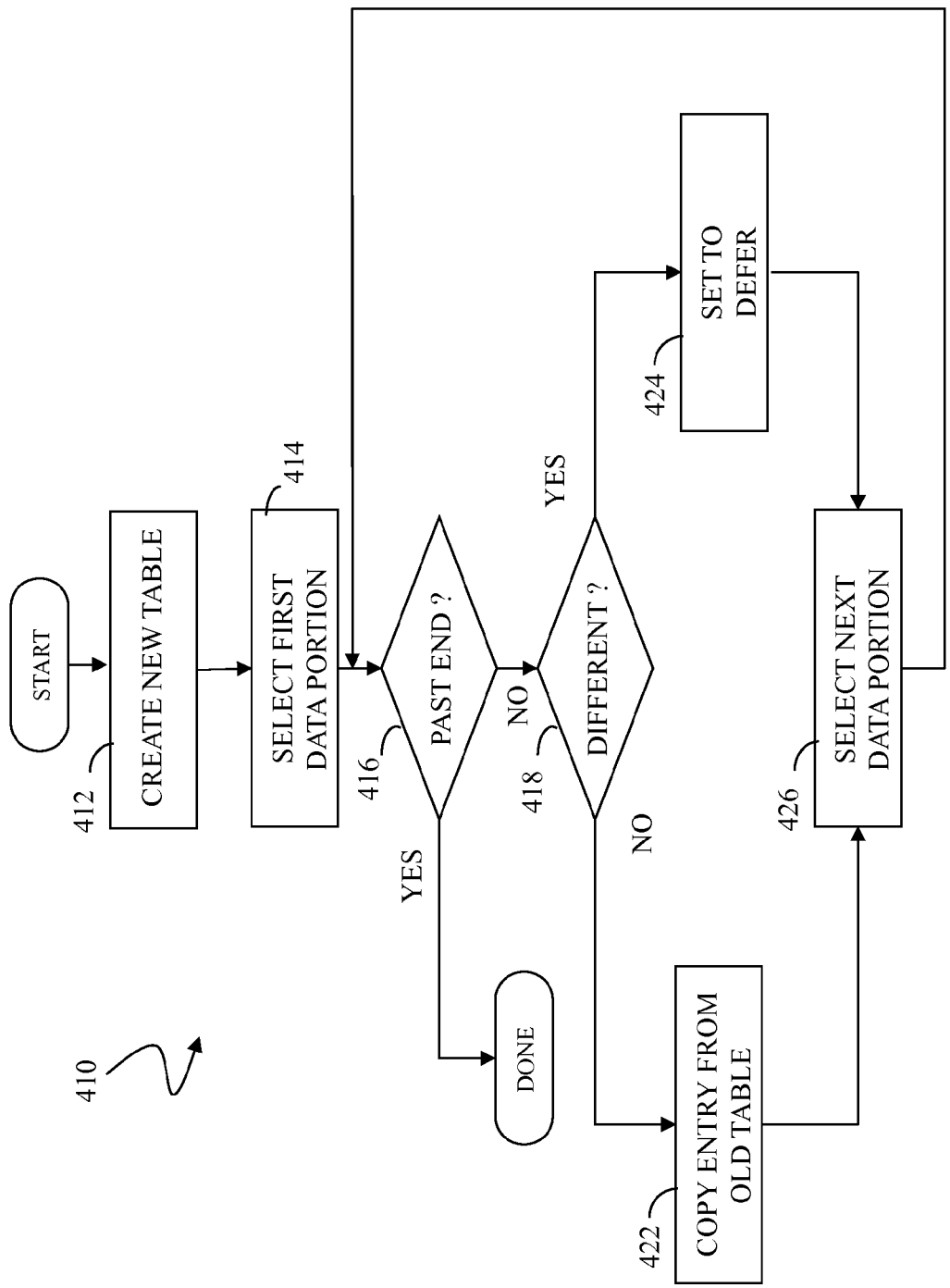
FIG. 17 is a flow diagram illustrating processing performed in connection with relinking a logical volume from a first targetless snapshot to a second targetless snapshot according to the system described herein.

Referring to FIG. 17, a flow diagram 410 illustrates processing performed in connection with relinking a logical volume from a first snapshot (first target global sequence number) to a second, different, snapshot (second target global sequence number). Processing begins at a first step 412 where a new table (like the table 362, discussed above) is created. When a logical device is relinked from one targetless snapshot to another, a separate table is maintained for each of the snapshots. Once all appropriate data is provided to the new table (corresponding to the second targetless snapshot), then the old table may be deleted. Following the step 412 is a step 414 where an iteration counter is set to point to a first one of the entries in the old table. Following the step 414 is a test step 416 where it is determined if all of the entries in the old table have been processed. If so, then processing is complete. Otherwise, control transfers from the step 416 to a test step 418 where it is determined if a table entry corresponding to the iteration counter is different between the old table and the new table. Note that, if data is written to the logical device for which targetless snapshots are being provided any time between the first targetless snapshot and the second targetless snapshot, then the corresponding entries in the old and new tables will be different. Note that, in some embodiments, any writes provided to the logical volume being relinked prior to the relinking may be discarded.

If it is determined at the step 418 that the table entry corresponding to the iteration counter is not different between the old table and the new table, then control transfers from the test step 418 to a step 422 where the table entry is copied from the old table to the new table. Otherwise, control transfers from the step 418 to a step 424 where the table entry corresponding to the iteration counter is set to indicate that entering the table entry is to be deferred to a later time. Setting the table entry to indicate that entering the table entry is to be deferred to a later time makes the transition occur more quickly. The table entry may be provided at a later time using, for example, processing similar to the processing illustrated in connection with the flow diagram 330, described above. Following the step 424 is a step 426 where the iteration counter is incremented. Note that the step 426 also follows the step 422. Following the step 426, control transfers back to the step 416 for a subsequent iteration.

Various embodiments discussed herein may be combined with each other in appropriate combinations in connection with the system described herein. Additionally, in some instances, the order of steps in the flow diagrams, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of providing snapshots for a logical device including a plurality of portions, comprising:
   maintaining a global sequence number for the logical device;
   providing a snapshot table having a plurality of entries, wherein each of the entries corresponds to a snapshot and includes a sequence number associated with a particular one of the snapshots, the sequence number for each entry corresponding to the global sequence number at a time the particular one of the snapshots is created;
   providing a replication pointer table having a plurality of entries corresponding to portions of the logical device, one or more of the plurality of entries corresponding to a specific portion of the logical device;
   in response to a request to perform a write operation to write new data to the specific portion of the logical device, determining whether a sequence number associated with the specific portion of the logical device is less than the global sequence number;
   if the sequence number associated with the specific portion of the logical device is less than the global sequence number, then prior to performing the write operation, copying old data from the specific portion to a location in a pool device, creating a new entry in the replication pointer table for the specific portion, setting a pointer in the new entry to point to the location in the pool device and setting the sequence number associated with the specific portion to equal the global sequence number, wherein the replication data pointer table is separate from the snapshot table, which is not modified in connection with the write operation, and wherein, for each portion of the plurality of portions, a new entry is created in the replication data table for the portion only when, in response to a request to perform a write operation to the portion, it is determined that a sequence number associated with the portion is less than the global sequence number;
   maintaining data in a volatile memory portion that corresponds to data previously directed to be written to a corresponding portion of the logical device;
   associating a sequence number with the volatile memory portion using a table that associates sequence numbers with volatile memory portions; and
   in response to a sequence number associated with the volatile memory portion being different than the global sequence number, copying data from the corresponding portion of the logical device to the pool device prior to writing new data to the volatile memory portion.

2. A method, according to claim 1, wherein reading data from a snapshot associated with a particular sequence number includes determining that a sequence number corresponding to data being read is less than or equal to the particular sequence number.

3. A method, according to claim 1, wherein the logical device is a thin logical device.

4. A method, according to claim 1, wherein entries in the replication data pointer table each include a pointer to specific data in the data pool and include a sequence number associated with the specific data.

5. A method, according to claim 4, wherein the entries in the replication data pointer table are accessed according to each portion of the logical device.

6. A method, according to claim 1, wherein the sequence number associated with the volatile memory portion corresponds to a value of the global sequence number at a time when the data is written.

7. A method, according to claim 1, further comprising:
   linking a new logical device to a first particular snapshot by creating a table; and
   setting entries in the table to point to one of: a portion of the logical device and a location of the pool data.

8. A method, according to claim 7, wherein, prior to setting entries in the table, each of the entries is provided with an initial value indicating that the corresponding entry is undefined.

9. A method, according to claim 7, further comprising:
   relinking the new logical device to a second particular snapshot by modifying entries in the table that point to a portion of the logical device to which a write operation is performed between a time of the first particular snapshot and a time of the second particular snapshot.

10. A non-transitory computer-readable medium containing software that provides snapshots for a logical device, the software comprising:
    executable code that maintains a global sequence number for the logical device;

executable code that provides a snapshot table having a plurality of entries, wherein each of the entries corresponds to a snapshot and includes a sequence number associated with a particular one of the snapshots, the sequence number for each entry corresponding to the global sequence number at a time the particular one of the snapshots is created;

executable code that provides a replication pointer table having a plurality of entries corresponding to portions of the logical device, one or more of the plurality of entries corresponding to a specific portion of the logical device;

executable code that, in response to a request to perform a write operation to write new data to the specific portion of the logical device, determines whether a sequence number associated with a specific portion of the logical device is less than the global sequence number executable code that, prior to performing the write operation, copies old data from the specific portion to a location in a pool device, creates a new entry in the replication pointer table for the specific portion sets a pointer in the new entry to point to the location in the pool device and sets the sequence number associated with the specific portion to equal the global sequence number in response to the sequence number associated with the specific portion of the logical device being less than the global sequence number, wherein the replication data pointer table is separate from the snapshot table, which is not modified in connection with the write operation, and wherein, for each portion of the plurality of portions, a new entry is created in the replication data table for the portion only when, in response to a request to perform a write operation to the portion, it is determined that a sequence number associated with the portion is less than the global sequence number;

executable code that maintains data in a volatile memory portion that corresponds to data previously directed to be written to a corresponding portion of the logical device;

executable code that associates a sequence number with the volatile memory portion using a table that associates sequence numbers with volatile memory portions; and executable code that copies data from the corresponding portion of the logical device to the pool device prior to writing new data to the volatile memory portion in response to a sequence number associated with the volatile memory portion being different than the global sequence number.

11. A non-transitory computer-readable medium, according to claim 10, wherein executable code that reads data from a snapshot associated with a particular sequence number determines that a sequence number corresponding to data being read is less than or equal to the particular sequence number.

12. A non-transitory computer-readable medium, according to claim 10, wherein the logical device is a thin logical device.

13. A non-transitory computer-readable medium, according to claim 10, wherein entries in the replication data pointer table each include a pointer to specific data in the data pool and include a sequence number associated with the specific data.

14. A non-transitory computer-readable medium, according to claim 13, wherein the entries in the replication data pointer table are accessed according to each portion of the logical device.

15. A non-transitory computer-readable medium, according to claim 10, wherein the sequence number associated with the volatile memory portion corresponds to a value of the global sequence number at a time when the data is written.

16. A non-transitory computer-readable medium, according to claim 10,
further comprising:
executable code that links a new logical device to a first particular snapshot by creating a table; and
executable code that sets entries in the table to point to one of: a portion of the logical device and a location of the pool data.

17. A non-transitory computer-readable medium, according to claim 16, wherein, prior to setting entries in the table, each of the entries is provided with an initial value indicating that the corresponding entry is undefined.

18. A non-transitory computer-readable medium, according to claim 16, further comprising:
executable code that relinks the new logical device to a second particular snapshot by modifying entries in the table that point to a portion of the logical device to which a write operation is performed between a time of the first particular snapshot and a time of the second particular snapshot.

19. A method of providing snapshots for a logical device including a plurality of portions, comprising:
maintaining a global sequence number for the logical device, the global sequence number incremented each time a snapshot is created;
providing a data pool for storing data in connection with maintaining snapshots;
providing a data structure in connection with maintaining snapshots for the logical device, the data structure having one or more entries corresponding to the logical device, each of the one or more entries corresponding to one of the plurality of portions of the logical device;
for at least a first of the plurality of portions of the logical device, maintaining a sequence number representing a value of the global sequence number at a time a most recent entry corresponding to the portion was created in the data structure;
in response to a request to perform a write operation to write new data to the first portion of the logical device, determining whether the sequence number for the first portion is less than the global sequence number;
if the sequence number is less than the global sequence number, then prior to performing the write operation:
copying old data from the first portion to a first location in the data pool;
creating a new entry in the data structure for the first portion;
setting a pointer in the new entry to point to the first location in the data pool; and
setting the sequence number for the first portion equal to the global sequence number,
wherein, for each of the plurality or portions of the logical device, a new entry is created in the data structure for the portion only when, in response to a request to perform a write operation to the portion, it is determined that the sequence number for the specific portion is less than the global sequence number.

\* \* \* \* \*